Sept. 10, 1929.     C. F. CONOVER     1,728,107
CONTROL DEVICE FOR STOVES
Filed May 2, 1928
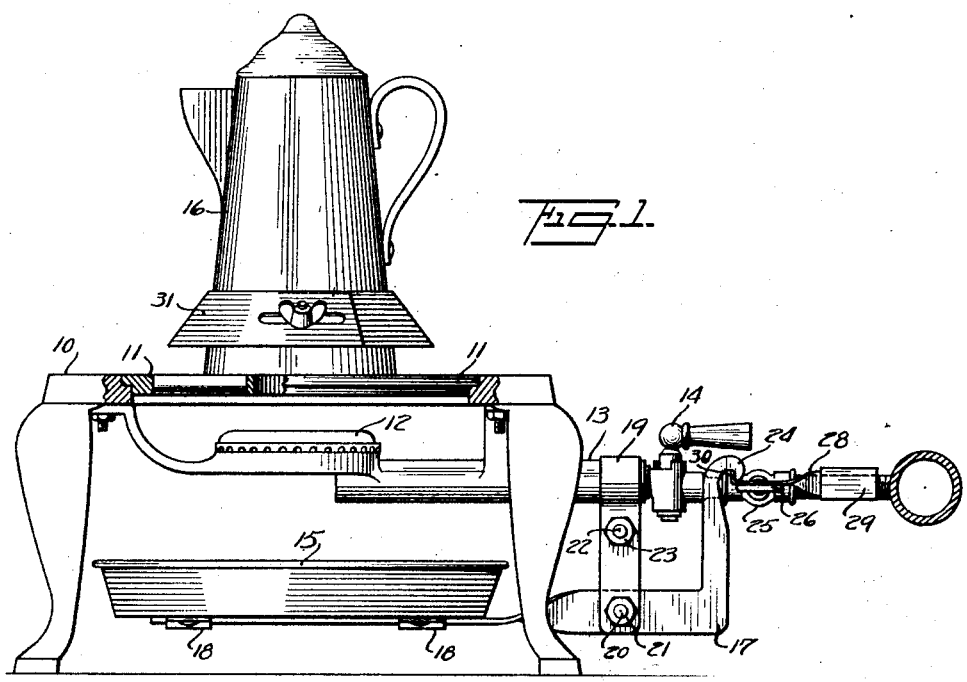
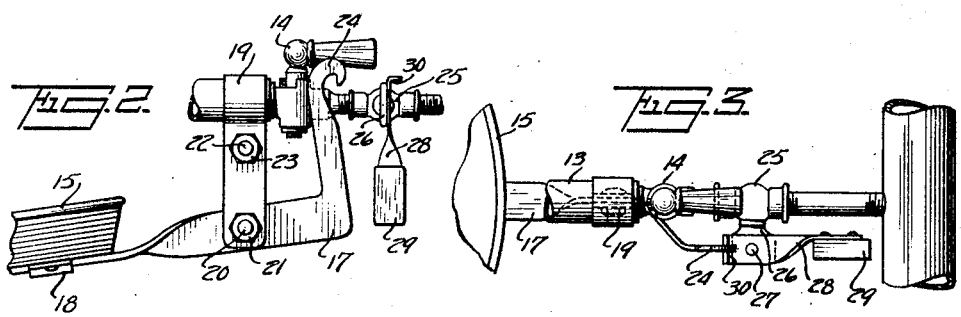
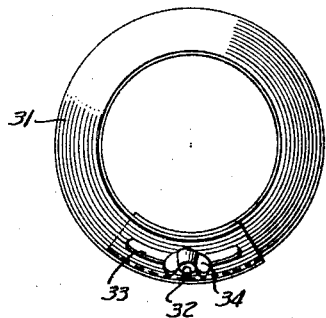
WITNESSES
INVENTOR
Charles F. Conover
BY
ATTORNEY Patented Sept. 10, 1929.

1,728,107

UNITED STATES PATENT OFFICE.

CHARLES F. CONOVER, OF BROOKLYN, NEW YORK.

CONTROL DEVICE FOR STOVES.

Application filed May 2, 1928. Serial No. 274,509.

This invention relates to a device adapted to be operated by the overflow of a cooking vessel on a stove, for the purpose of shutting off the heat of the stove.

The principal object of the invention is to provide a device of the indicated character which will be inexpensive, easy to install, and reliable in operation.

The nature of the invention and its distinguishing features and advantages will appear when the following specification is read in connection with the accompanying drawing, in which—

Figure 1, is a side elevation of a stove equipped with a device of the present invention, ready to operate to shut off the heat.

Fig. 2, is a side view illustrating the disposition of parts of the device after it has been operated.

Fig. 3, is a plan view illustrating the disposition of parts of the device when ready for operation.

Fig. 4, is a plan view of the overflow deflector.

The invention is shown, by way of example, applied to a gas stove 10 having a grid 11, burner 12 below the grid and gas feed pipe 13 connected with the burner 12 to feed gas thereto, there being a cock 14 in the pipe 13, for controlling the flow of gas to the burner 12 in the usual manner.

The device of the present invention includes a pan 15 or other receptacle, which will be disposed below the burner 12, and be sufficiently large to catch any overflow from a cooking vessel 16 supported or resting on the grid 11. In the present instance the cooking vessel 16 consists of a coffee pot, in which coffee is boiled, but obviously other vessels used for cooking purposes, in which water is used, or vessels for boiling water, are contemplated. The pan 15 or other receptacle is provided with a rigid member 17 which extends laterally therefrom. The said member 17 may be connected with the pan 15 in any preferred manner, so that the pan will have the necessary stability. In the present instance the bottom of the pan 15 has secured thereto straps 18 which slidably accommodate one end of the member 17, so that the pan may be readily removed, if desired, for the purpose of emptying the same. The member 17 is connected with a bracket member 19 by a screw bolt 20 and nut 21, or other suitable means, so that the member 17 will have pivotal or swinging movement with respect to the bracket member 19, in a vertical plane. The bracket member 19 is rigidly attached to the feed pipe 13, in the present instance, the upper end of the member 19 being so formed as to fit around the pipe 13, and is held in clamping engagement therewith by a screw bolt 22 and nut 23. The member 17 is provided with a hook 24. A cock 25 is connected in the feed pipe 13 at the supply side of the cock 14. The valve member 26 of the cock 25 has rigidly connected therewith as at 27 a member 28 having a weight 29 at one end, and an upturned edge 30 at the opposite end. The hook 24 is engageable with the upturned edge 30, and when so engaged holds the valve member 26 of the cock 25 in an open position allowing gas to flow through the feed pipe 13 to the burner 12, when the cock 14 is open. The weight of the pan 15, is such as to counterbalance the weight 29. It will now be apparent that when the contents of the coffee pot 16 boils over because of overheating, the overflow will pass downwardly into the pan 15, and as a consequence the hook 24 will be disengaged from the upturned edge 30, followed by the movement of the valve member 26 of the cock 25 to a closed position, by the action of the weighted member 28, as shown in Fig. 2. The gas will then stop flowing to the burner 12, and the heat will thus be automatically shut off.

In order to prevent the overflow of a cooking vessel from flowing downwardly, and extinguishing the flames of the burner 12, there is provided a deflector 31 adapted to encircle and embrace the cooking vessel. The deflector 31 consists of a piece of sheet metal having a threaded stud 32 at one end which is received in a slot 33 in the opposite end, and a wing nut 34 adapted to be threaded on the stud 32. It will therefore be understood that the deflector 31 is constructed so as to fit cooking vessels of different sizes. The deflector 31 when applied to a cooking vessel slopes downwardly to deflect the overflow sufficiently to pass around the burner of the stove, as shown most clearly in Fig. 1.

From the foregoing it will be apparent that there has been described a device which serves for the purpose of automatically shutting off the supply of gas to the burner of the stove, by the overflow of any liquid, such as coffee, tea, or water being cooked or boiled on the top of the stove. It is well known that it very often occurs that a person goes away and forgets about the possibility of a vessel overflowing while on the stove. Consequently when the liquid in the cooking vessel boils over, it puts out the flames, and the gas continues to flow and fills the room, which is very dangerous, and liable to cause an explosion or a person to be asphyxiated.

It is to be understood that the device may be applied to a cock in a supply pipe connected with several branches respectively connected with several burners, under which will be arranged a pan or other receptacle sufficiently large to receive the overflow from one or more cooking vessels, for the purpose of shutting off the flow of gas to all the burners. It is also to be understood that the device may be applied to an electrical stove, after which the weighted member 28 will operate a switch controlling the supply of current to the heating element of such stove.

I claim:

In combination, a stove having a grid for the purpose of supporting a cooking vessel, and a burner beneath the grid; means which supplies gas to the burner, a cock which controls the flow of gas, a rigid member mounted for pivotal movement, a pan on one end of the rigid member beneath the burner and a hook on the opposite end thereof, a weighted member fastened to and extending laterally from the valve member of said cock, said hook being engageable with an edge portion of said weighted member to hold the valve member in opened position to allow the gas to flow to the burner, said rigid member being moved by the movement of the pan under the influence of a certain amount of overflow liquid caught thereby from the vessel, to release said weighted member and allowing the latter to turn the valve member to the closed position to shut off the flow of gas to said burner.

Signed at New York in the county of New York and State of New York this 1st day of May, A. D. 1928.

CHARLES F. CONOVER.